United States Patent
Seltzer et al.

(10) Patent No.: US 9,984,678 B2
(45) Date of Patent: May 29, 2018

(54) FACTORED TRANSFORMS FOR SEPARABLE ADAPTATION OF ACOUSTIC MODELS

(75) Inventors: Michael Lewis Seltzer, Seattle, WA (US); Alejandro Acero, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 854 days.

(21) Appl. No.: 13/427,907

(22) Filed: Mar. 23, 2012

(65) Prior Publication Data

US 2013/0253930 A1   Sep. 26, 2013

(51) Int. Cl.
*G10L 15/06* (2013.01)
*G10L 15/20* (2006.01)
*G10L 15/07* (2013.01)

(52) U.S. Cl.
CPC ............ *G10L 15/063* (2013.01); *G10L 15/07* (2013.01); *G10L 15/20* (2013.01)

(58) Field of Classification Search
CPC ........ G10L 15/063; G10L 15/20; G10L 15/07
See application file for complete search history.

(56) References Cited

U.S. PATENT DOCUMENTS

| | | | |
|---|---|---|---|
| 6,418,411 B1 | 7/2002 | Gong | |
| 6,915,259 B2 * | 7/2005 | Rigazio et al. | 704/244 |
| 7,386,443 B1 | 6/2008 | Parthasarathy et al. | |
| 7,451,085 B2 * | 11/2008 | Rose et al. | 704/244 |
| 2008/0010057 A1 | 1/2008 | Chengalvarayan et al. | |
| 2008/0167868 A1 * | 7/2008 | Kanevsky | G10L 15/20 704/233 |
| 2009/0024390 A1 | 1/2009 | Deshmukh et al. | |
| 2011/0015925 A1 | 1/2011 | Xu et al. | |
| 2011/0040561 A1 * | 2/2011 | Vair | G10L 17/04 704/240 |
| 2011/0257976 A1 | 10/2011 | Huo | |

(Continued)

OTHER PUBLICATIONS

Wang, et al., "Speaker and Noise Factorisation on the AURORA4 Task", in Prec. ICASSP, Prague, Czech Republic, 2011, pp. 4584-4587.*

(Continued)

*Primary Examiner* — Angela A Armstrong
(74) *Attorney, Agent, or Firm* — Medley, Behrens & Lewis, LLC

(57) ABSTRACT

Various technologies described herein pertain to adapting a speech recognizer to input speech data. A first linear transform can be selected from a first set of linear transforms based on a value of a first variability source corresponding to the input speech data, and a second linear transform can be selected from a second set of linear transforms based on a value of a second variability source corresponding to the input speech data. The linear transforms in the first and second sets can compensate for the first variability source and the second variability source, respectively. Moreover, the first linear transform can be applied to the input speech data to generate intermediate transformed speech data, and the second linear transform can be applied to the intermediate transformed speech data to generate transformed speech data. Further, speech can be recognized based on the transformed speech data to obtain a result.

20 Claims, 8 Drawing Sheets

(56) References Cited

U.S. PATENT DOCUMENTS

2012/0041764 A1* 2/2012 Xu et al. ............... 704/256.1
2014/0244251 A1* 8/2014 Rose et al. ............. 704/233

OTHER PUBLICATIONS

Jung, et al., "Speaker Adaptation Using ICA-Based Feature Transformation", Retrieved at <<http://etrij.etri.re.kr/Cyber/servlet/GetFile?fileid=SPF-1045893339214>>, ETRI Journal, vol. 24, No. 6, Dec. 2002, pp. 469-472.

Rigazio, et al., "Joint Environment and Speaker Adaptation", Retrieved at <<http://www.isca-speech.org/archive_open/archive_papers/adaptation/adap_093.pdf>>, Adaptation Methods for Automatic Speech Recognition, Sophia Antipolis, France, Aug. 29-30, 2001, pp. 93-96.

Gales, et al., "Robust Continuous Speech Recognition Using Parallel Model Combination", Retrieved at <<http://ieeexplore.ieee.org/stamp/stamp.jsp?tp=&arnumber=536929>>, IEEE Transactions on Speech and Audio Processing, vol. 4, No. 5, Sep. 1996, pp. 352-359.

Moreno, et al., "A Vector Taylor Series Approach for Environment-Independent Speech Recognition", Retrieved at <<http://citeseerx.ist.psu.edu/viewdoc/download?doi=10.1.1.64.4615&rep=rep1&type=pdf>>, in Proc. of ICASSP, vol. 2, 1996, pp. 1-5.

Kalinli, et al., "Noise Adaptive Training for Robust Automatic Speech Recognition", Retrieved at <<http://ieeexplore.ieee.org/stamp/stamp.jsp?tp=&arnumber=5439889>>, IEEE Transactions on Audio, Speech, and Language Processing, vol. 18, No. 8, Nov. 2010, pp. 1889-1901.

Liao, et al., "Adaptive Training with Joint Uncertainty Decoding for Robust Recognition of Noisy Data", Retrieved at <<http://citeseerx.ist.psu.edu/viewdoc/download?doi=10.1.1.163.8005&rep=rep1&type=pdf>>, in Proc. of ICASSP, Honolulu, Hawaii, 2007, pp. 389-392.

Saon, et al., "Robust Digit Recognition in Noisy Environments: The IBM Aurora 2 System", Retrieved at <<https://nats-www.informatik.uni-hamburg.de/intern/proceedings/2001/eurospeech/papers/page629.pdf>>, in Proc. of Interspeech, Aalborg, Denmark, 2001, pp. 1-4.

Rigazio, et al., "Separating Speaker and Environmental Variabilities for Improved Recognition in Non-Stationary Conditions", Retrieved at <<http://perso.telecom-paristech.fr/~chollet/Biblio/Congres/Audio/Eurospeech01/CDROM/papers/page2347.pdf>>, in Proc. Eurospeech, Aalborg, Denmark, 2001, pp. 1-4.

Wang, et al., "Speaker and Noise Factorisation on the AURORA4 Task", Retrieved at <<http://140.124.72.88/lab/ICASSP2011/pdfs/0004584.pdf>>, in Proc. ICASSP, Prague, Czech Republic, 2011, pp. 4584-4587.

Gales, M.J.F., "Acoustic Factorisation", Retrieved at <<http://ieeexplore.ieee.org/stamp/stamp.jsp?tp=&arnumber=1034593>>, in Proc. ASRU, Moreno, Italy, 2001, pp. 77-80.

Seltzer, et al., "Separating Speaker and Environmental Variability Using Factored Transforms", Retrieved at <<http://research.microsoft.com/pubs/155400/IS110041.pdf>>, in Proc. Interspeech, Florence, Italy, Aug. 28-31, 2011, pp. 1097-1100.

Sim, et al., "Adaptation of Precision Matrix Models on Large Vocabulary Continuous Speech Recognition", Retrieved at <<http://ieeexplore.ieee.org/stamp/stamp.jsp?tp=&arnumber=1415059>>, in Proc. of ICASSP, Philadelphia, PA, 2005, pp. 97-100.

Akbacak, et al., "Environmental Sniffing: Noise Knowledge for Robust Speech Systems", Retrieved at <<http://ieeexplore.ieee.org/stamp/stamp.jsp?tp=&arnumber=4067018>>, IEEE Transactions on Audio, Speech, and Language Processing, vol. 15, No. 2, Feb. 2007, pp. 465-477.

Anastasakos, et al., "A Compact Model for Speaker-Adaptive Training", Retrieved at <<http://ieeexplore.ieee.org/stamp/stamp.jsp?tp=&arnumber=607807>>, in Proc. of ICSLP, Philadelphia, PA, 1996, pp. 1137-1140.

Pearce, et al., "The AURORA Experimental Framework for the Performance Evaluation of Speech Recognition Systems under Noisy Conditions", Retrieved at <<http://citeseerx.ist.psu.edu/viewdoc/download?doi=10.1.1.121.1762&rep=rep1&type=pdf>>, in Proc. of ISCA ITRW ASR, Paris, France, Sep. 2000, pp. 1-4.

Acero, et al., "HMM Adaptation Using Vector Taylor Series for Noisy Speech Recognition", Retrieved at <<http://research.microsoft.com/pubs/76536/2000-alexac-icslpb.pdf>>, in Proc. of ICSLP, 2000, pp. 1-4.

Shi, et al., "A study of irrelevant variability normalization based training and unsupervised online adaptation for lvcsr," Retrieved at <<http://www.isca-speech.org/archive/archive_papers/interspeech_2010/i10_1357.pdf>>, in Proc. Interspeech, Makuhari, Japan, Sep. 26-30, 2010, pp. 1357-1360.

Gales, M.J.F., "Maximum likelihood linear transformations for HMM-based speech recognition," Retrieved at <<http://www.ingentaconnect.com/content/ap/ia/1998/00000012/00000002/art00043>>, Computer Speech and Language, vol. 12, 1998, pp. 1-19.

* cited by examiner

FACTORED TRANSFORMS FOR SEPARABLE ADAPTATION OF ACOUSTIC MODELS

BACKGROUND

Speech recognition systems commonly translate spoken words into text. Speech recognition systems are typically statistical pattern classifiers trained with training data. However, acoustic mismatch between the speech data seen in deployment and speech data used to train the speech recognizer can cause degradation in performance. Moreover, such acoustic mismatch can be caused by various sources of variability. Examples of variability sources that can cause acoustic mismatch include the environment and the speaker. Conventional approaches for reducing the acoustic mismatch and enhancing performance commonly involve employing acoustic model adaptation. However, techniques for environmental or speaker adaptation have typically been developed independently.

Environmental adaptation, for instance, is commonly performed using techniques that utilize a parametric model that explains how clean speech is corrupted by additive and convolutional noise. Examples of such techniques include parallel model combination (PMC) and vector Taylor series (VTS) adaptation. These techniques can adapt parameters of the speech recognizer based on a small observation of the noise. However, in order for such approaches to operate, the acoustic model is commonly trained from clean speech or using specialized noise-adaptive training techniques, which can be impractical or costly.

In contrast, common techniques for speaker adaptation are data-driven approaches in which model parameters are transformed in a manner that maximizes a likelihood of adaptation data. For example, various versions of maximum likelihood linear regression (MLLR) or constrained maximum likelihood linear regression (CMLLR) can use one or more affine transforms to modify Gaussian parameters of the speech recognizer. These techniques need not be particular to speaker adaptation and can be used to compensate for other types of acoustic mismatch, including environmental noise. Yet, with these conventional adaptation approaches that are based on maximizing the likelihood of adaptation data, the sources of the acoustic mismatch for which the estimated transforms are compensating are commonly unknown. This can inhibit these transforms (and the adaptation data in general) from being reused for a speaker while in different acoustic environments, for instance.

Another conventional technique provides for joint environment and speaker adaptation using Jacobian adaptation for noise compensation combined with MLLR for speaker adaptation. More recently, VTS adaptation was used to update both means and variances of MLLR-compensated acoustic models. The VTS noise parameters and the MLLR transforms were jointly estimated using an iterative approach. However, these approaches combine different adaptation strategies for different sources of variability. Moreover, VTS assumes a clean acoustic model, which can make use of data collected from actual deployed applications very difficult and computationally expensive. Further, some acoustic features may be incompatible with such techniques.

SUMMARY

Described herein are various technologies that pertain to adapting a speech recognizer to input speech data. For instance, the speech recognizer can be adapted by transforming features. A first linear transform can be selected from a first set of linear transforms based on a value of a first variability source corresponding to the input speech data, and a second linear transform can be selected from a second set of linear transforms based on a value of a second variability source corresponding to the input speech data. The linear transforms in the first and second sets can compensate for the first variability source and the second variability source, respectively. Moreover, the first linear transform can be applied to the input speech data to generate intermediate transformed speech data, and the second linear transform can be applied to the intermediate transformed speech data to generate transformed speech data. Further, speech can be recognized based on the transformed speech data to obtain a result.

In accordance with various embodiments, a cascade of linear transforms can be employed to adapt the input speech data in a manner that allows variability sources to be accounted for separately. For example, the variability sources can include speaker variability and environmental variability. However, it is also contemplated that the variability sources can additionally or alternatively include other sources such as, for instance, accent variability, gender variability, channel variability, device variability, and so forth. According to another example, the linear transforms can be CMLLR transforms; however, the claimed subject matter is not so limited.

Further, the linear transforms that separately compensate for the plurality of variability sources can be trained based on utterances, where each of the utterances is associated with corresponding values for each of the plurality of variability sources. The linear transforms in respective sets for the plurality of variability sources can be initialized (e.g., environmental transforms and speaker transforms can be initialized, etc.). Moreover, a variability source can be selected from the plurality of variability sources (e.g., environmental variability can be selected). Based on the selected variability source, the linear transforms in the respective sets for the remainder of the variability sources other than the selected variability source can be fixed (e.g., current estimates of the speaker transforms can be fixed). Moreover, the utterances can be grouped according to values of the selected variability source (e.g., grouped according to environment). Further, the linear transforms for the values of the selected variability source can be trained from corresponding groups of the utterances with the linear transforms for the remainder of the variability sources fixed. Thereafter, a next variability source can be selected from the plurality of variability sources (e.g., speaker variability can be selected after selection of the environmental variability) and the foregoing can be repeated based on such selection.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
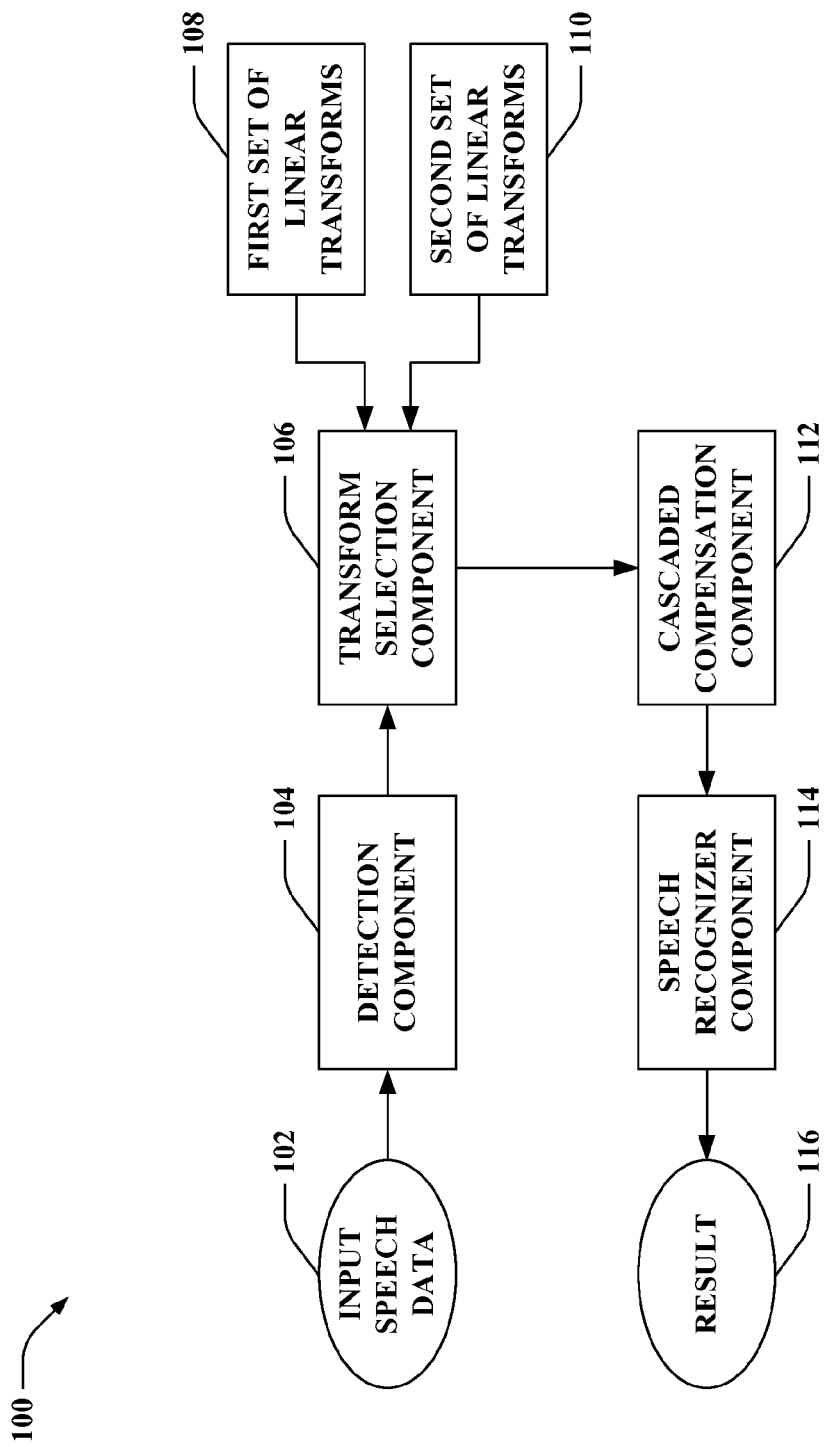
FIG. 1 illustrates a functional block diagram of an exemplary system that performs factored adaptation on input speech data.

Various technologies pertaining to training and employing factored transforms for separable adaptation of acoustic models of a speech recognizer are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Technologies pertaining to joint compensation of acoustic mismatch of a speech recognizer due to a plurality of variability sources, where such compensation uses a cascade of linear transforms, are set forth herein. Examples of the variability sources include speaker variability and environmental variability; yet, it is further contemplated that the plurality of variability sources can additionally or alternatively include other sources of variability such as accent variability, gender variability, channel variability, device variability, or the like. The cascade of linear transforms jointly compensates for mismatch due to the plurality of variability sources, while the linear transforms used in the cascade each separately compensate for a respective variability source (e.g., a first linear transform compensates for a first variability source, a second linear transform compensates for a second variability source, etc.). Further, performing adaptation in this manner enables the linear transforms to be reused across user sessions (e.g., during runtime). Thus, for instance, a speaker transform estimated in one environment can be applied when the same user is in different environments. According to another illustration, an environmental transform estimated from speech data of a speaker in a particular environment can be applied when a different speaker is in the same environment.

Moreover, set forth herein are technologies pertaining to estimating factored transforms in order to identify constituent transforms that appropriately capture various sources of variability in adaptation data. The transforms can be estimated using a data-driven approach, and thus, no assumptions about an underlying acoustic model or features have to be made. Moreover, use of linear transforms can simplify employment of adaptive training; in comparison, various conventional approaches use more complicated and computationally-expensive training approaches. Further, techniques set forth herein can be implemented as a transformation of features rather than a transformation of acoustic model parameters of a speech recognizer (e.g., transformation of features can be more efficient than transformation of acoustic model parameters).

Referring now to the drawings, FIG. 1 illustrates a system 100 that performs factored adaptation on input speech data 102. Factored adaptation can refer to jointly compensating for mismatch due to a plurality of sources of variability using a cascade of linear transforms that separately compensate for each of the plurality of sources of variability. The input speech data 102 can be speech received from a speaker (e.g., user) via a microphone or substantially any other sensor that can capture sound. Additionally or alternatively, it is contemplated that the input speech data 102 can be retrieved from a data store (not shown).

The system 100 includes a detection component 104 that can detect value(s) of variability source(s) corresponding to the input speech data 102. According to an example, the detection component 104 can detect a speaker (e.g., user) and/or environment associated with the input speech data 102. By way of illustration, examples of environments include in a car, in an office, outside on the street, etc. However, it is contemplated that other definitions of environments are intended to fall within the scope of the hereto appended claims.

It is further contemplated that the detection component 104 can identify value(s) of substantially any other source(s) of variability corresponding to the input speech data 102 in addition to or instead of the speaker and the environment. By way of example and not limitation, the detection component 104 can determine a type of accent associated with the input speech data 102 (e.g., the accent of the speaker), a gender of a speaker associated with the input speech data 102, a channel by which the input speech data 102 was captured (e.g., handset versus speakerphone of a phone, etc.), a type of device used to capture the input speech data 102 (e.g., high quality headset versus cellphone, etc.), a combination thereof, and so forth.

According to an example, the detection component 104 can detect a value of a variability source corresponding to the input speech data 102 from data (e.g., metadata) associated with the input speech data 102. By way of another example, the detection component 104 can identify a speaker using a device hardware code, caller identification on a phone, a login name, or the like. Pursuant to yet another example, the detection component 104 can discern an environment at least in part from a device that captures the input speech data 102 (e.g., an in-car voice control system, a living room game console, etc.).

Moreover, the system 100 includes a transform selection component 106 that selects linear transforms based on the values of the variability sources identified by the detection component 104. The transform selection component 106 can select a first linear transform from a first set of linear transforms 108 based on the value of the first variability source corresponding to the input speech data 102. Further, the transform selection component 106 can select a second linear transform from a second set of linear transforms 110 based on the value of the second variability source corresponding to the input speech data 102. Although not shown, it is contemplated that the first set of linear transforms 108 and the second set of linear transforms 110 can be retained in a data store. Moreover, the transform selection component 106 can retrieve the selected linear transforms from such data store.

According to an example, the transform selection component 106 can select linear transforms associated with a top score. In accordance with an illustration, if the speaker is known but the environment is unknown, the transform selection component 106 can try each environmental transform and decode in a speech recognizer (e.g., a speech recognizer component 114). The speech recognizer can output a score associated with the hypotheses, and the transform selection component 106 can choose a top output (e.g., corresponding to a particular environmental transform) as the one associated with a top score. By way of another example, the transform selection component 106 can select linear transforms in a probabilistic manner. Following this example, a weighted combination of transforms for a particular variability source can be used (e.g., weighted combination of the environmental transforms, weighted combination of the speaker transforms, etc.); thus, the transform selection component 106 can determine the weights for such combination. However, the claimed subject matter is not limited to the foregoing examples.

It is further contemplated that the transform selection component 106 can select more than two linear transforms when compensating for more than two variability sources. For instance, the transform selection component 106 can select a third linear transform from a third set of linear transforms (not shown) based on a value of a third variability source corresponding to the input speech data 102, and so forth. Although many of the examples described herein relate to applying two linear transforms to jointly compensate for two sources of variability, it is to be appreciated that such examples can be extended to scenarios where more than two linear transforms are jointly applied.

The first set of linear transforms 108 can include linear transforms respectively associated with various values of the first variability source. Accordingly, linear transforms in the first set of linear transforms 108 can compensate for the first variability source. Similarly, the second set of linear transforms 110 can include linear transforms respectively associated with various values of the second variability source; thus, linear transforms in the second set of linear transforms 110 can compensate for the second variability source.

By way of example, the first set of linear transforms 108 can include S speaker transforms for S different speakers, and the second set of linear transforms 110 can include E environmental transforms for E different environments, where S and E can each be positive integers. Following this example, if the detection component 104 detects that a speaker of the input speech data 102 is "Joe Smith" and an environment associated with the input speech data 102 is "in a car", then the transform selection component 106 can select a particular speaker transform corresponding to "Joe Smith" from the first set of linear transforms 108 (e.g., the set of S speaker transforms) and a particular environmental transform corresponding to "in a car" from the second set of linear transforms 110 (e.g., the set of E speaker transforms). Yet, it is to be appreciated that the claimed subject matter is not limited to the foregoing example.

Additionally or alternatively, it is contemplated that a speaker transform in the first set of linear transforms 108 can be associated with an unknown speaker and an environmental transform in the second set of linear transforms 110 can be associated with an unknown environment. Such transforms associated with an unknown speaker or an unknown environment can be set to an identity matrix {A=I, b=0}, for instance. Thus, if the detection component 104 detects that a speaker of the input speech data 102 is "Ann Jones" and an environment is unknown, then the transform selection component 106 can select a particular speaker transform corresponding to "Ann Jones" from the first set of linear transforms 108 (e.g., the set of S speaker transforms) and a particular environmental transform corresponding to an unknown environment from the second set of linear transforms 110 (e.g., the set of E speaker transforms). It is to be appreciated, however, that the claimed subject matter is not limited to the above example.

The linear transforms in the first set of linear transforms 108 and the second set of linear transforms 110 can be constrained maximum likelihood linear regression (CMLLR) transforms. Thus, the first linear transform and the second linear transform selected by the transform selection component 106 can be CMLLR transforms. However, it is to be appreciated that other types of linear transforms such as, for instance, maximum likelihood linear regression (MLLR) transforms, etc., are intended to fall within the scope of the hereto appended claims.

The system 100 further includes a cascaded compensation component 112 that jointly compensates for the plurality of variability sources. The cascaded compensation component 112 can apply the first linear transform to the input speech data 102 to generate intermediate transformed speech data. Moreover, the cascaded compensation component 112 can apply the second linear transform to the intermediate transformed speech data to generate transformed speech data. Thus, the cascaded compensation component 112 can apply the first linear transform and the second linear transform in sequence to jointly compensate for the first variability source and the second variability source in the resulting transformed speech data. For example, if the cascaded compensation component 112 performs adaptation using a cascade of CMLLR transforms, then the CMLLR transforms can compensate both Gaussian means and variances and can be efficiently applied to features (e.g., the input speech data 102) rather than acoustic model parameters (e.g., of a speech recognizer component 114).

The system 100 can further include a speech recognizer component 114 that recognizes speech based on the transformed speech data to obtain a result 116. For instance, the result 116 can be text that corresponds to the input speech data 102. Moreover, the speech recognizer component 114 can include a set of acoustic models (not shown) that can be utilized to decode the transformed speech data to generate the result 116. Thus, the cascaded compensation component 112 can apply the linear transforms to the input speech data 102 rather than the acoustic models of the speech recognizer component 114 to mitigate mismatch due to the plurality of variability sources (e.g., mismatch between speech seen at deployment and speech used to train the acoustic models of the speech recognizer component 114). Yet, according to other examples, it is contemplated that the cascaded compensation component 112 can apply the linear transforms to the acoustic models of the speech recognizer 114.

According to an example, the first set of linear transforms 108 can include a set of speaker transforms (e.g., S speaker transforms) and the first variability source can be speaker variability. Moreover, the second set of linear transforms 110 can include a set of environmental transforms (e.g., E environmental transforms) and the second variability source can be environmental variability. Following this example, the transform selection component 106 can select a particular speaker transform from the first set of linear transforms 108 based on a speaker of the input speech data 102. The transforms selection component 106 can also select a particular environmental transform from the second set of linear transforms 110 based on an environment in which the input speech data 102 is captured. Moreover, the cascaded compensation component 112 can apply the particular speaker transform to the input speech data 102 to generate the intermediate transformed speech data, and can apply the particular environmental transform to the intermediate transformed speech data to generate the transformed speech data, which can thereafter be inputted to the speech recognizer component 114.

Pursuant to another example, the first set of linear transforms 108 can include a set of environmental transforms (e.g., E environmental transforms) and the first variability source can be environmental variability. Further, the second set of linear transforms 110 can include a set of speaker transforms (e.g., S speaker transforms) and the second variability source can be speaker variability. In accordance with this example, the transform selection component 106 can select a particular environmental transform from the first set of linear transforms 108 based on an environment in which the input speech data 102 is captured, and can select a particular speaker transform from the second set of linear transforms 110 based on a speaker of the input speech data 102. Moreover, the cascaded compensation component 112 can apply the particular environmental transform to the input speech data 102 to generate the intermediate transformed speech data, and can apply the particular speaker transform to the intermediate transformed speech data to generate the transformed speech data, wherein the transformed speech data can thereafter be provided to the speech recognizer component 114.

In various embodiments, the system 100 can compensate for three variability sources. Accordingly, the transform selection component 106 can further select a third linear transform from a third set of linear transforms based on a value of a third variability source corresponding to the input speech data 102, where the linear transforms in the third set can compensate for the third variability source. Further, the cascaded compensation component 112 can apply the third linear transform selected by the transform selection component 106 to the transformed speech data outputted upon applying the second linear transform. The speech recognizer component 114 can thereafter recognize the speech based on the output of the third linear transform being applied by the cascaded compensation component 112 to obtain the result 116. It is also contemplated that the system 100 can compensate for more than three variability sources; hence, the cascaded compensation component 112 can similarly apply the additional linear transform(s) in sequence (e.g., a fourth linear transform can be applied to an intermediate output resulting from application of the third linear transform, etc.). Thus, the cascaded compensation component 112 can apply the linear transforms in sequence to jointly compensate for the plurality of variability sources, and can generate the transformed speech data.

Many examples set forth herein relate to joint compensation of two variability sources, namely, environmental variability and speaker variability. In particular, many of the examples pertain to joint compensation where the cascade compensation component 112 applies an environmental transform to the input speech data 102 followed by application of a speaker transform to the intermediate transformed speech data. Further, many of the examples provided herein relate to training environmental transforms and speaker transforms that can be utilized for joint compensation where an environmental transform is first applied, and a speaker transform is thereafter applied. Yet, it is to be appreciated that these examples can be extended to scenarios where mismatch due to more than two variability sources is jointly compensated, the two variability sources include at least one variability source other than environmental variability and speaker variability, the speaker transform is applied prior to the environmental transform, a combination thereof, and so forth.

It is assumed that a plurality of variability sources can be jointly compensated for with a single linear transform (e.g., a single CMLLR transform):

$$y=Ax+b \qquad (1)$$

In equation (1), x represents a vector corresponding to the input speech data 102, A and b represent a linear transform, and y represents a vector corresponding to the transformed speech data. More particularly, as part of the linear transform, A is a matrix and b is an offset vector. For instance, if x is a vector that includes m elements, then A is an m by m matrix and b is a vector that includes m elements, where m is a positive integer.

Rather than employing a single linear transform as set forth in equation (1), the cascaded compensation component 112 can apply a sequence of linear transforms. According to an example, the linear transform of equation (1) can be decomposed into two distinct transforms that separately capture two sources of variability. This can be expressed as follows:

$$y=A_s(A_e x+b_e)+b_s \qquad (2)$$

In the above expression, $W_s=\{A_s,b_s\}$ and $W_e=\{A_e,b_e\}$ represent speaker and environmental transforms, respectively. Thus, the cascaded compensation component 112 can apply the environmental transform to the input speech data 102 to generate intermediate transformed speech data, and can thereafter apply the speaker transform to the intermediate transformed data to generate the transformed speech data. The equivalence between equation (1) and equation (2) can be seen by letting $A=A_sA_e$ and $b=A_sb_e+b_s$.

Moreover, since the relationship between the environmental and speaker transforms is linear, the transforms in equation (2) can also be applied in the reverse order where the speaker transform is applied first by the cascade compensation component 112 to generate intermediate transformed speech data, followed by the cascade compensation component 112 applying the environmental transform to the intermediate transformed speech data to generate transformed speech data. Such reversal of the order of application can be an equivalent model for factored adaptation, but different transforms may be learned (as set forth below) since matrix operations are generally not commutative.

Figure 2:
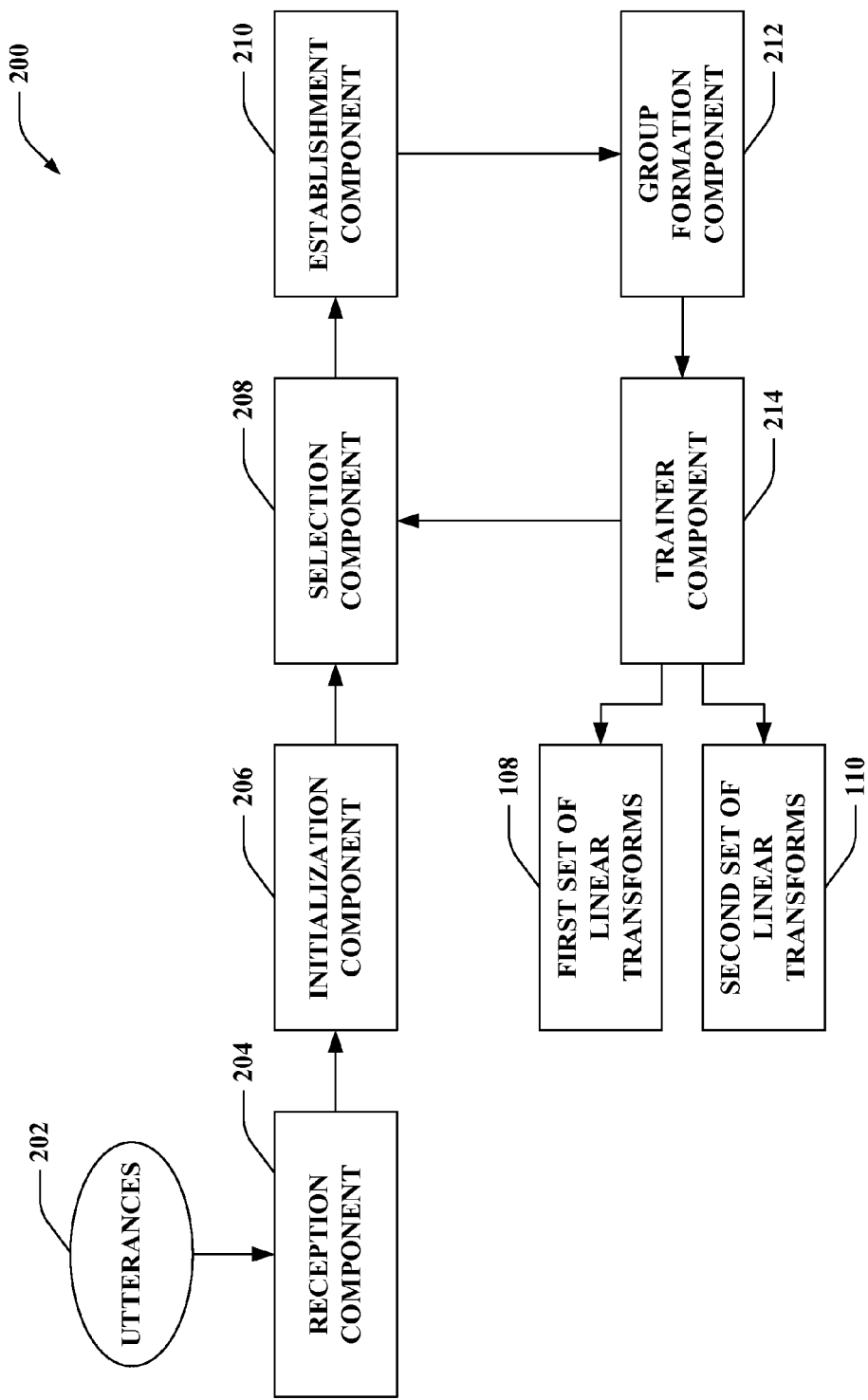
FIG. 2 illustrates a functional block diagram of an exemplary system that trains linear transforms that separately compensate for a plurality of variability sources.

Turning now to FIG. 2, illustrated is a system 200 that trains linear transforms that separately compensate for a plurality of variability sources. By way of illustration, the system 200 can train the first set of linear transforms 108 and the second set of linear transforms 110 employed by the system 100 of FIG. 1. In the examples set forth below, the first set of linear transforms 108 can be a set of E environmental transforms and the second set of linear transforms 110 can be a set of S speaker transforms; yet, it is to be appreciated that the claimed subject matter is not so limited. Moreover, it is contemplated that the first set of linear transforms 108 and the second set of linear transforms 110 trained by the system 200 can be reusable during runtime across user sessions.

The system 200 can train the linear transforms based on adaptation data that includes utterances 202. According to an example, the input speech data 102 of FIG. 1 can be retained as part of the adaptation data, and thus, can be employed to optimize the linear transforms; yet, it is contemplated that the claimed subject matter is not so limited. The adaptation data can be associated with a plurality of values of the first variability source (e.g., plurality of environments) and a plurality of values of the second variability source (e.g., plurality of speakers). Moreover, the first set of linear transforms 108 and the second set of linear transforms 110 can be trained as a function of the adaptation data. Although many of the examples herein describe training based on adaptation data, it is also contemplated that the system 200 can additionally or alternatively train the linear transforms based on training data (e.g., used to train acoustic models of the speech recognizer component 114).

It can be assumed that adaptation data exists from many speakers in one or more different environments. Let $\Lambda_E$ be the set of environmental transforms (e.g., the first set of linear transforms 108) for the E different environments in the data. Similarly, let $\Lambda_S$ be the set of speaker transforms (e.g., the second set of linear transforms 110) for S different speakers in the data. Given the adaptation data, the system 200 can estimate the set of transforms $(\Lambda_E, \Lambda_S)$ by maximizing a likelihood of the adaptation data. If i, t, and k are defined as indices for an utterance (e.g., from the utterances 202), a frame, and a Gaussian component, respectively, then an auxiliary function, Q, can be expressed as follows:

$$Q(\Lambda_E, \Lambda_S) = \Sigma_{i,t,k} \gamma_{tk}^{(i)} \log(p(y_t^{(i)}|k)) \quad (3)$$

In equation (3), $y_t^{(i)}$ is defined according to equation (2) and $p(y_t^{(i)}|k)$ is a Gaussian distribution with mean $\mu_k$ and covariance matrix $\Sigma_k$. Moreover, $\gamma_{tk}^{(i)}$ is a posterior probability.

Because a linear transform defined in equation (1) can be arbitrarily factored into two transforms as in equation (2), it typically may not be possible to separate the environmental and speaker variability without additional constraints. Thus, the following assumptions about the nature of the adaptation data can be made. For instance, it can be assumed that each of the utterances 202 has an associated speaker label and environment label. These labels may represent the true speaker and/or environment or some other identifier such as cluster membership. In addition, it can be assumed that there is a significant diversity of speakers in each environment of interest. Using these assumptions, each of the transforms in $(\Lambda_E, \Lambda_S)$ can be optimized by the system 200 using a distinct (but overlapping) set of data.

The system 200 includes a reception component 204 that receives the utterances 202. Each of the utterances 202 is associated with corresponding values for each of the plurality of variability sources. For example, a particular utterance can be associated with a given speaker and a given environment; however, it is contemplated that the claimed subject matter is not so limited. By way of another example, the values for each of the plurality of variability sources can be determined from labels associated with the utterances 202; yet, it is to be appreciated that the claims appended hereto are not so limited.

A closed-form solution for training (e.g., optimizing) the full set of transforms $(\Lambda_E, \Lambda_S)$ from the utterances 202 may not be available. Accordingly, the system 200 can alternately optimize the speaker transforms and the environmental transforms. For instance, initial values for the transforms can be chosen, then the environmental transforms can be estimated while the speaker transforms are fixed, and thereafter the speaker transforms can be estimated while the environmental transforms are fixed. The foregoing can be repeated for a fixed number of iterations or until a likelihood of the adaptation data converges. Accordingly, the system 200 can include an initialization component 206, a selection component 208, an establishment component 210, a group formation component 212, and a trainer component 214.

The initialization component 206 can initialize linear transforms in respective sets for the plurality of variability sources. For instance, the initialization component 206 can initialize environmental transforms in the set of environmental transforms (e.g., the first set of linear transforms 108) and speaker transforms in the set of speaker transforms (e.g., the second set of linear transforms 110). The linear transforms can be initialized by the initialization component 206 such that A matrices are initialized to identity matrices and offset vectors b are initialized to zero; yet, it is to be appreciated that the claimed subject matter is not limited to the foregoing illustration.

Further, the selection component 208 can select a variability source from the plurality of variability sources. Based upon the variability source selected by the selection component 208, the establishment component 210 can fix the linear transforms in respective sets for a remainder of the variability sources other than the selected variability source. Moreover, the group formation component 212 can group the utterances 202 according to values of the selected variability source chosen by the selection component 208. Further, the trainer component 214 can train linear transforms for the values of the selected variability source from corresponding groups of the utterances 202 with the linear transforms for the remainder of the variability sources fixed. The foregoing can be repeated as the selection component 208 can sequentially select each of the plurality of variability sources.

According to an example, the initialization component 206 can initialize the set of environmental transforms (e.g., the first set of linear transforms 108) and the set of speaker transforms (e.g., the second set of linear transforms 110). The selection component 208 can first select environmental variability. Responsive to selecting the environmental variability, the establishment component 210 can fix the linear transforms in the set of speaker transforms $\Lambda_S$ to current estimates (e.g., initialized estimates set by the initialization component 206). Moreover, responsive to selecting the environmental variability, the group formation component 212 can group the utterances 202 according to environment (e.g., a first group that includes a first subset of the utterances 202 associated with a first environment can be formed, . . . , and an Eth group that includes an Eth subset of the utterances 202 associated with an Eth environment can be formed). Further, the trainer component 214 can train linear transforms for each of the E environments from corresponding groups of the utterances 202 with the speaker transforms fixed. Hence, the trainer component 214 can optimize $W_e$ for each environment e={1, ..., E} while the speaker transforms $\Lambda_S$ are fixed.

Further following this example, the selection component 208 can select speaker variability after selecting the environmental variability. In response to selecting the speaker variability, the establishment component 210 can fix the linear transforms in the set of environmental transforms $\Lambda_E$ to current estimates (e.g., estimates of $W_e$ for each environment e={1, ..., E} generated by the trainer component 214 when the speaker transforms $\Lambda_S$ were previously fixed). Further, responsive to selecting the speaker variability, the group formation component 212 can group the utterances 202 according to speaker (e.g., a first group that includes a first subset of the utterances 202 associated with a first speaker can be formed, ..., and an Sth group that includes an Sth subset of the utterances 202 associated with an Sth speaker can be formed). Moreover, the trainer component 214 can train linear transforms for each of the S speakers from corresponding groups of the utterances 202 with the environmental transforms fixed. Thus, the trainer component 214 can optimize $W_s$ for each speaker s={1, ..., S} while the environmental transforms $\Lambda_E$ are fixed.

According to an illustration, a single iteration of the foregoing example can be performed. By way of another illustration, more than one iteration can be performed; following this illustration, the selection component 208 can thereafter again select the environmental variability, and the foregoing can be repeated. Pursuant to another example, it is contemplated that the selection component 208 can first select the speaker variability, and can subsequently select the environmental variability.

By way of further example, it is to be appreciated that the system 200 can train linear transforms that separately compensate for more than two variability sources. For instance, if linear transforms are trained to compensate for three sources of variability, then a first variability source can be selected by the selection component 208 and current estimates of linear transforms for the other two variability sources can be fixed by the establishment component 210 while the trainer component 214 trains the linear transforms for the values of the first variability source. Thereafter, a second variability source can be selected by the selection component 208 and current estimates of the linear transforms for the first and third variability sources can be fixed by the establishment component 210 while the trainer component 214 trains the linear transforms for the values of the second variability source, and so forth.

Figure 3:
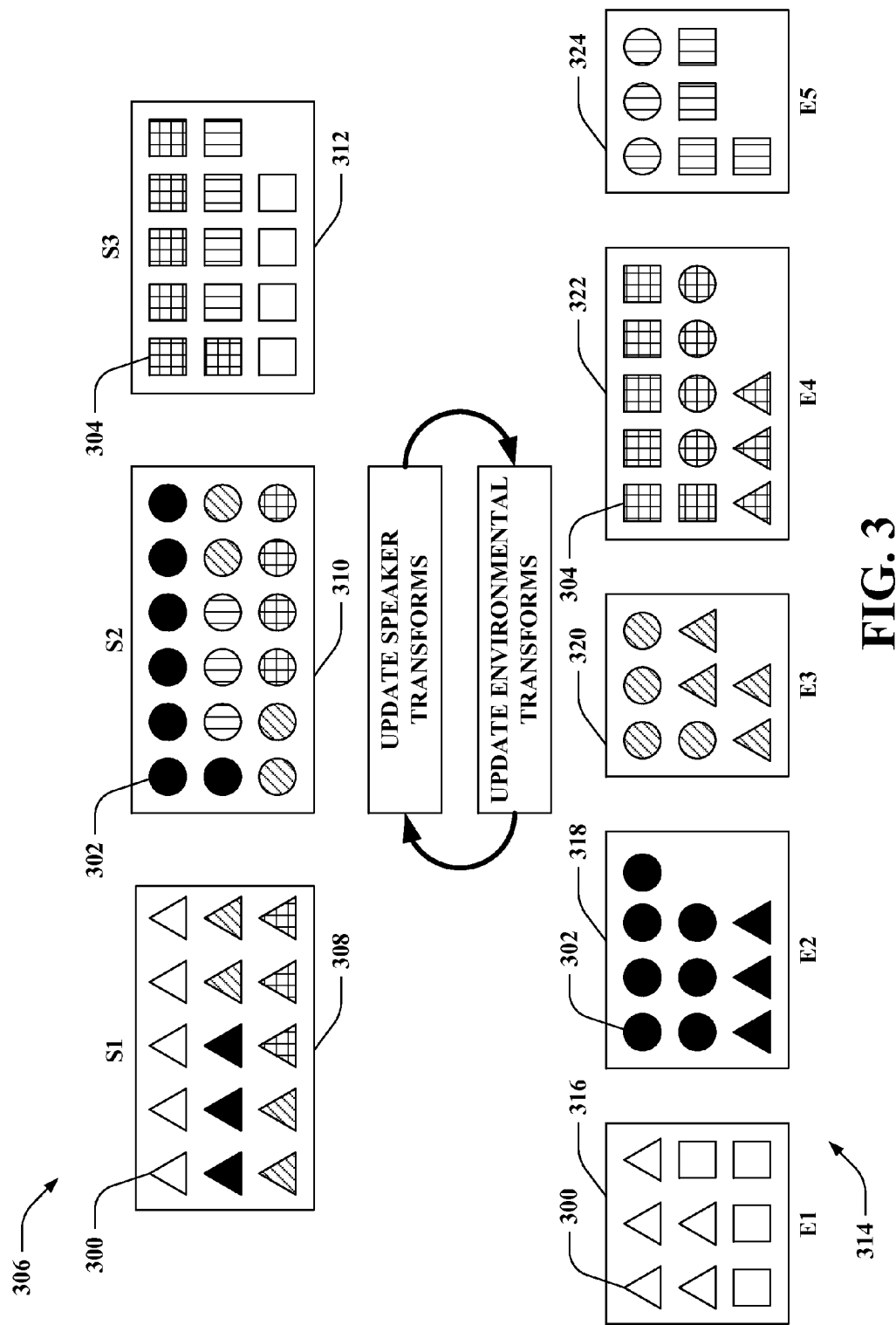
FIG. 3 illustrates an exemplary diagram that depicts groups of utterances that can be created as part of training linear transforms.

With reference to FIG. 3, illustrated is an exemplary diagram that depicts groups of the utterances 202 that can be created (e.g., by the group formation component 212 of FIG. 2) as part of training linear transforms. FIG. 3 shows a plurality of utterances used for training the linear transforms. As illustrated in FIG. 3, each triangle, circle, and square represents a corresponding utterance (e.g., training example). For example, triangle 300, circle 302, and square 304 represent respective utterances. In FIG. 3, shape represents a speaker of an utterance and fill represents an environment in which the particular utterance was captured. Thus, FIG. 3 shows utterances associated with three distinct speakers and five differing environments.

At 306, the utterances are grouped according to speaker. More particularly, three groups of utterances are shown: group 308, group 310, and group 312, collectively referred to as groups 308-312. The group 308 corresponds to speaker S1, the group 310 corresponds to speaker S2, and the group 312 corresponds to speaker S3. Moreover, each of the groups 308-312 includes utterances associated with two or more environments.

When the utterances are grouped as shown at 306, speaker transforms can be updated (e.g., trained, estimated, etc.) while environmental transforms can be fixed at their current estimates. Thus, a speaker transform can be trained for speaker S1 based on the utterances included in group 308, a speaker transform can be trained for speaker S2 based on the utterances included in group 310, and a speaker transform can be trained for speaker S3 based on the utterances included in group 312.

Moreover, the utterances can be regrouped according to environment as shown at 314, which depicts five groups of utterances: group 316, group 318, group 320, group 322, and group 324, collectively referred to as groups 316-324. The group 316 corresponds to environment E1, the group 318 corresponds to environment E2, the group 320 corresponds to environment E3, the group 322 corresponds to environment E4, and the group 324 corresponds to the environment E5.

When the utterances are grouped as depicted at 314, environmental transforms can be updated (e.g., trained, estimated, etc.) while speaker transforms can be fixed at their current estimates. Accordingly, an environmental transform can be trained for environment E1 based on the utterances included in group 316, an environmental transform can be trained for environment E2 based on the utterances included in group 318, an environmental transform can be trained for environment E3 based on the utterances included in group 320, an environmental transform can be trained for environment E4 based on the utterances included in group 322, and an environmental transform can be trained for environment E5 based on the utterances included in group 324.

It is to be appreciated that the utterances can again be regrouped according to speaker as shown at 306 to further refine the speaker transforms while the environmental transforms can be fixed as current estimates, and so forth. However, it is also contemplated that more than one iteration need not be performed when training the linear transforms.

Hence, FIG. 3 shows that the utterances are partitioned differently depending on the linear transforms being estimated. For instance, the utterances are partitioned according to common speaker for updating speaker transforms, while the utterances are partitioned according to common environment for updating environmental transforms.

Again, reference is made to FIG. 2. Various examples of the training performed by the trainer component 214 to generate the speaker transforms and the environmental transforms are set forth below. It is to be appreciated, however, that such examples are provided for illustration purposes, and the claimed subject matter is not so limited.

For instance, the trainer component 214 can optimize the speaker transform for speaker s. An index $i_s$ can be defined as the index over all utterances from that speaker, and the auxiliary function from expression (3) can be rewritten as follows:

$$Q(W_s, \overline{W}_s, \overline{\Lambda}_E) = \Sigma_{i_s,t,k} \gamma_{tk}^{(i_s)} \log(p(y_t^{(i_s)}|k)) \tag{4}$$

As used herein, a bar on top of a variable (e.g., $\overline{A}$) represents the current estimate of that variable. Under this objective function, $y_t$ can be written as:

$$y_t = A_s(\overline{A}_{e(i_s)} x_t^{(i_s)} \overline{b}_{e(i_s)}) + b_s \tag{5}$$

$$y_t = A_s \overline{x}_{e,t}^{(i_s)} + b_s \tag{6}$$

In the foregoing, $e(i_s)$ is the environment for the utterance $i_s$ and $\bar{x}_{e,t}^{(i_s)}$ is the observation with the transform for environment $e$ applied. Thus, the log probability in equation (4) can be written as:

$$\log(p(y_t^{(i_s)}|k)) = \qquad (7)$$
$$\log\left(|\sum_k|\right) - \log(|A_s|^2) + (A_s\bar{x}_{e,t}^{(i_s)} + b_s - \mu_k)^T \sum_k^{-1} (A_s\bar{x}_{e,t}^{(i_s)} + b_s - \mu_k)$$

From equation (7), it is clear that the auxiliary function in equation (4) is equivalent to that of conventional CMLLR where the observations are replaced by the environmental-transformed features and the standard row-by-row optimization procedure can be employed.

Moreover, the trainer component 214 can optimize the set of environmental transforms. A similar auxiliary function can be defined for each of the environments, in which an index $i_e$ that indexes all utterances from that environment can be defined.

$$Q(W_e, \bar{W}_e, \bar{\Lambda}_S) = \Sigma_{i_e,t,k} \gamma_{tk}^{(i_e)} \log(p(y_t^{(i_e)}|k)) \qquad (8)$$

Expression (8) is similar to expression (4) except that the set of utterances is different and the speaker transforms are now assumed fixed. In this case, $$y_t^{(i_e)} = \bar{A}_{s(i_e)}(A_e x_t^{(i_e)} + b_e) + \bar{b}_{s(i_e)} \qquad (9)$$

In the foregoing expression, $s(i_e)$ is the speaker for utterance $i_e$. The log probability in equation (8) can then be expressed as:

$$\log(p(y_t^{(i_e)}|k)) = \qquad (10)$$
$$\log\left(|\sum_k|\right) - \log(|\bar{A}_s|^2) - \log(|A_e|^2) + (y_t^{(i_e)} - \mu_k)^T \sum_k^{-1} (y_t^{(i_e)} - \mu_k)$$

Substituting equation (9) into equation (10) and rearranging terms gives the following:

$$\log(p(y_t^{(i_e)}|k)) = \qquad (11)$$
$$\log\left(|\sum_{k,s(i_e)}|\right) - \log(|A_e|^2) + (x_{e,t}^{(i_e)} - \bar{\mu}_{k,s(i_e)})^T \sum_{k,s(i_e)}^{-1} (x_{e,t}^{(i_e)} - \bar{\mu}_{k,s(i_e)})$$

In the foregoing equation:

$$x_{e,t}^{(i_e)} = A_e x_t^{(i_e)} + b_e \qquad (12)$$

$$\bar{\mu}_{k,s(i_e)} = \bar{A}_{s(i_e)}^{-1}(\mu_k - \bar{b}_{s(i_e)}) \qquad (13)$$

$$\bar{\Sigma}_{k,s(i_e)} = \bar{A}_{s(i_e)}^{-1} \Sigma_k \bar{A}_{s(i_e)}^{-1,T} \qquad (14)$$

By substituting expressions (11)-(14) into expression (8), it can be seen that optimizing the environmental transforms can be substantially similar to performing CMLLR with adapted Gaussian parameters given by expressions (13) and (14). Note that the adapted covariances can have the same structure as the speaker transforms. Further, if the transforms are full matrices, then so are the covariance matrices; in this case, the row-by-row optimization for full covariances is used.

The following sets forth various illustrations related to performance of a single iteration of the joint optimization. According to an illustration, full matrices can be used for all the transforms. By way of another illustration, when starting with optimization of the environmental transforms with the speaker transforms initialized to $A_s=I$ and $b_s=0$, the environmental transforms could be optimized with conventional CMLLR with diagonal covariance Gaussians, rather than the full covariances indicated by equation (14). Yet, full-covariance optimization is used if a second iteration were to be performed.

According to another example, the system 200 can employ adaptive training with factored transforms. Because both the environmental and speaker transforms are linear operations on features of input speech data, they can be combined into a single linear transform that can be applied to the features. As a result, adaptive training can be performed. To do so, a set of hidden Markov model (HMM) parameters $\Lambda_X$ can be added to the auxiliary function in equation (3) as shown below:

$$Q(\Lambda_X, \Lambda_E, \Lambda_S) = \Sigma_{i,t,k} \gamma_{tk}^{(i)} \log(N(y_t^{(i)}; \mu_k, \Sigma_k)) \qquad (15)$$

Similar to above, the speaker transforms, environmental transforms, and acoustic model parameters are each optimized in succession while the other parameters are held fixed. To update the acoustic model parameters, the speaker and environmental transforms can be combined into a single linear transform (depending on the speaker and the environment of an utterance) and then the acoustic model parameters can be updated using the transformed features. This can be referred to as Speaker and Environment Adaptive Training (SEAT) to reflect that fact that separate transforms can be estimated to compensate for the speaker variability and the environmental variability. It is to be appreciated, however, that the claimed subject matter is not limited to the foregoing example.

Figure 4:
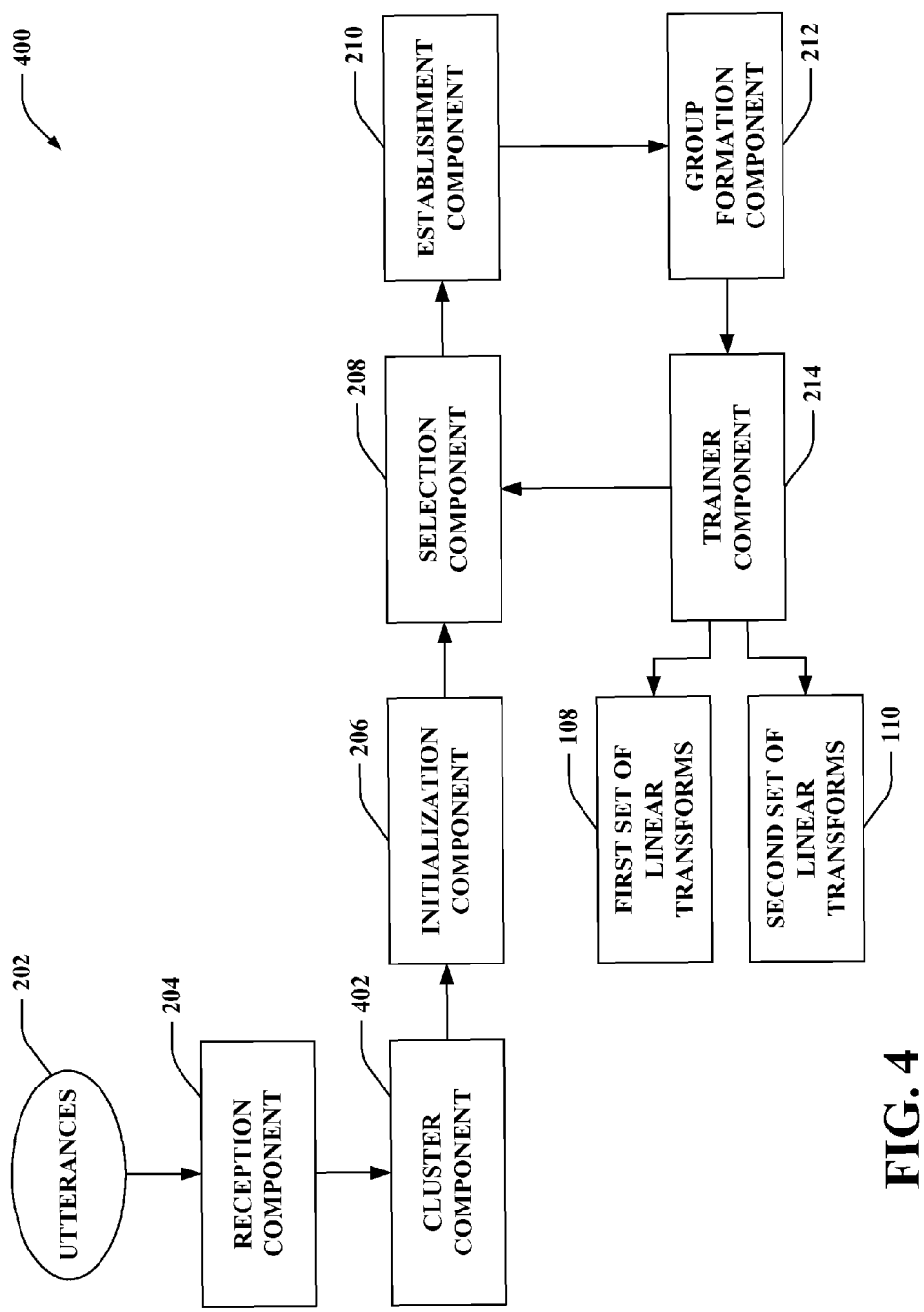
FIG. 4 illustrates a functional block diagram of an exemplary system that performs environmental clustering.

Referring to FIG. 4, illustrated is a system 400 that performs environmental clustering. The system 400 includes the reception component 204 that can receive the utterances 202. Moreover, the system 400 includes a cluster component 402 that performs unsupervised clustering of environments associated with the utterances 202. Further, the linear transforms can be trained based on clusters formed by the cluster component 402.

When performing factored adaptation, groups of utterances with common speakers or environments are identified. Examples described above note that the utterances 202 can have environment labels, which can be used to identify groups. However, labeling environments in training data or adaptation data may not be scalable to large amounts of data. To account for the foregoing, the cluster component 402 can automatically cluster the environments associated with the utterances 202 in an unsupervised manner. Thus, factored adaptation can be effectuated without using environment labels.

The cluster component 402 can employ unsupervised clustering to characterize environments associated with the utterances 202. For example, the cluster component 402 can use a Gaussian mixture model trained on silence regions of the utterances 202 in the training data or adaptation data. After the mixture model has been trained, each Gaussian in the model can be assumed to define a disparate acoustic environment. The cluster component 402 can label the utterances 202 in the training data or adaptation data by computing an average posterior probability of the silence segments in each of the utterances 202 and finding the Gaussian in the mixture with a top score. Data associated with each cluster is then used (e.g., by group formation component 212, trainer component 214, etc.) to train the transform for that environment. However, it is to be appreciated that the claimed subject matter is not limited to the foregoing example (e.g., other acoustic sniffing algorithms are intended to fall within the scope of the hereto appended claims).

At run time, an initial silence portion of an utterance can be used to estimate an environmental cluster for the utterance. For example, the detection component 104 of FIG. 1 can evaluate the initial silence portion of the input speech data 102 to estimate the environmental cluster. The transform selection component 106 of FIG. 1 can select an environmental transform for the environmental cluster with a highest posterior probability, and the cascaded compensation component 112 can apply the selected environmental transform to the utterance as described herein.

By way of another example, it is contemplated that the cluster component 402 can perform unsupervised clustering of speakers associated with the utterances 202. It is contemplated that unsupervised clustering of speakers can be performed in addition to or instead of unsupervised clustering of environments.

Figure 5:
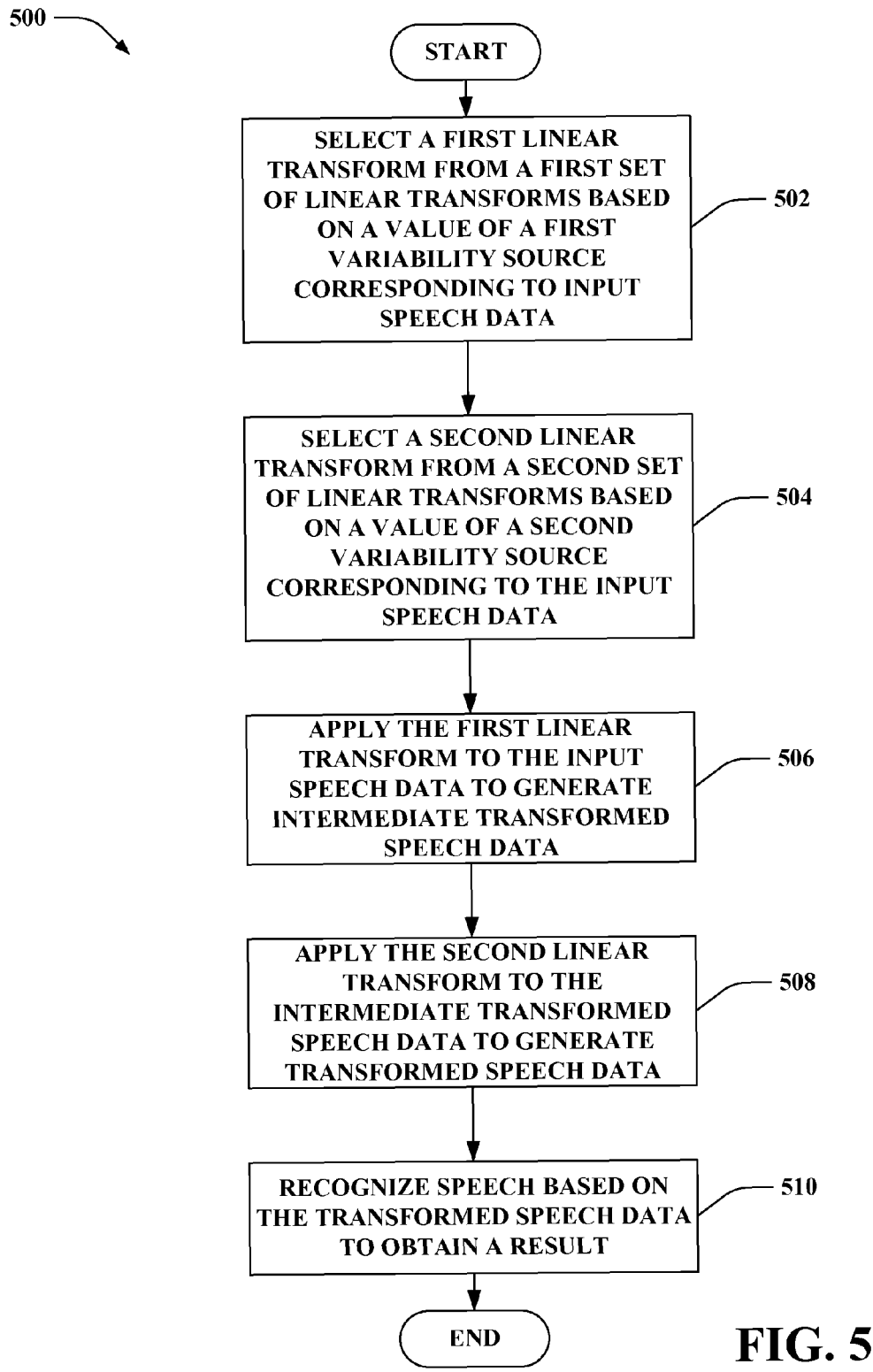
FIG. 5 is a flow diagram that illustrates an exemplary methodology of adapting input speech data inputted to a speech recognizer.
Figure 6:
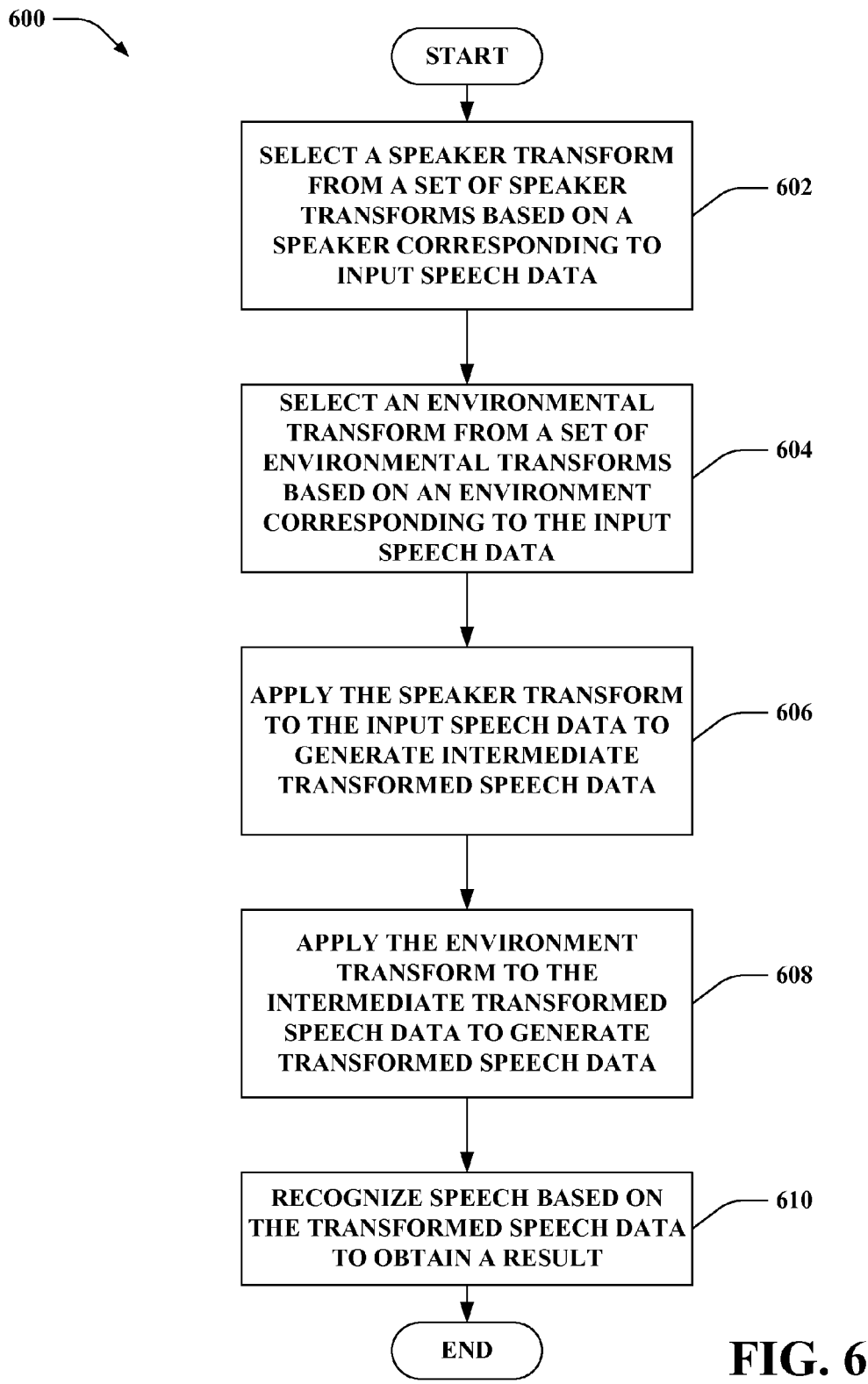
FIG. 6 is a flow diagram that illustrates another exemplary methodology of adapting input speech data.
Figure 7:
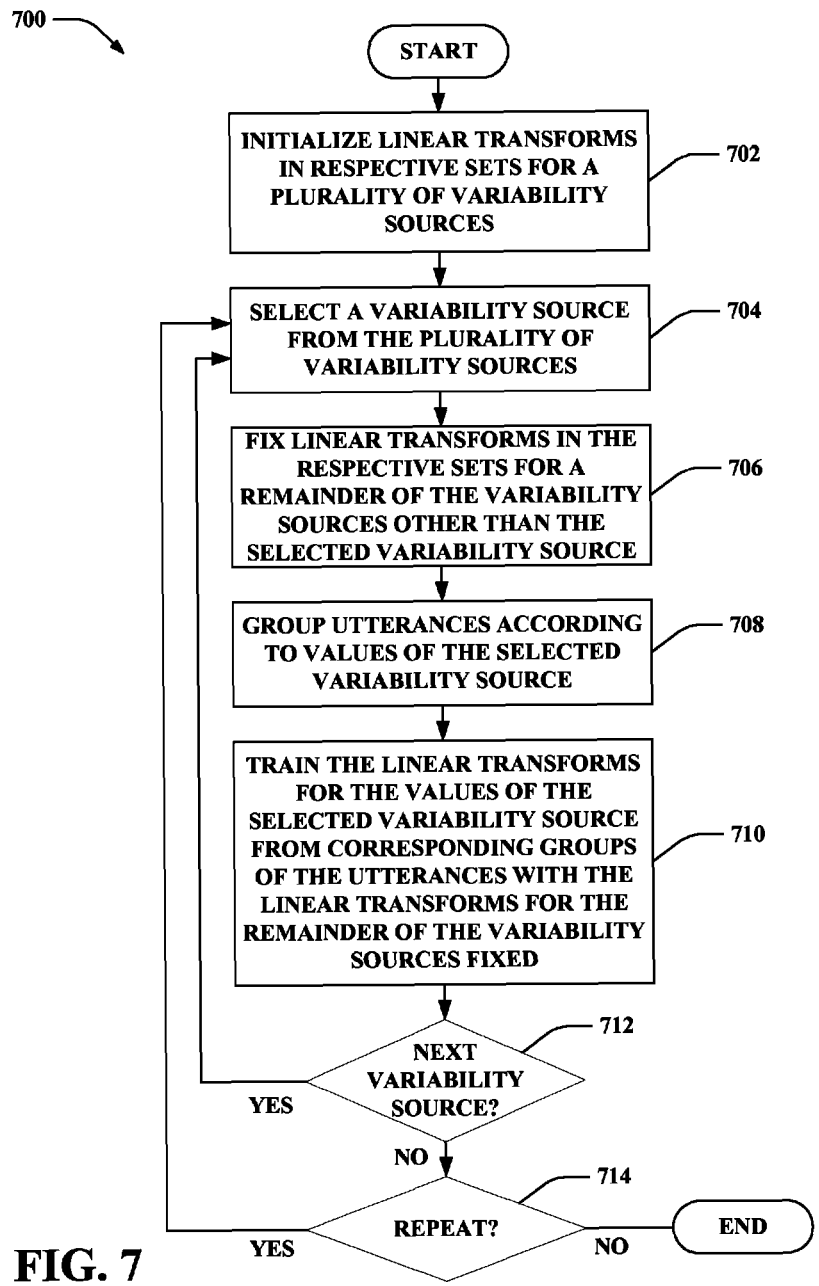
FIG. 7 is a flow diagram that illustrates an exemplary methodology of training linear transforms that separately compensate for a plurality of variability sources.

FIGS. 5-7 illustrate exemplary methodologies relating to factored adaptation. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 5 illustrates a methodology 500 of adapting input speech data inputted to a speech recognizer. At 502, a first linear transform can be selected from a first set of linear transforms based on a value of a first variability source corresponding to the input speech data. For instance, the linear transforms in the first set can compensate for the first variability source. At 504, a second linear transform can be selected from a second set of linear transforms based on a value of a second variability source corresponding to the input speech data. The linear transforms in the second set, for instance, can compensate for the second variability source. At 506, the first linear transform can be applied to the input speech data to generate intermediate transformed speech data. At 508, the second linear transform can be applied to the intermediate transformed speech data to generate transformed speech data. At 510, speech can be recognized based on the transformed speech data to obtain a result (e.g., text).

Turning to FIG. 6, illustrated is another methodology 600 of adapting input speech data. At 602, a speaker transform can be selected from a set of speaker transforms based on a speaker corresponding to the input speech data. The speaker transforms can be linear transforms that compensate for speaker variability. At 604, an environmental transform can be selected from a set of environmental transforms based on an environment corresponding to the input speech data. Moreover, the environmental transforms can be linear transforms that compensate for environmental variability. At 606, the speaker transform can be applied to the input speech data to generate intermediate transformed speech data. At 608, the environmental transform can be applied to the intermediate transformed speech data to generate transformed speech data. At 610, speech can be recognized based on the transformed speech data to obtain a result (e.g., text).

With reference to FIG. 7, illustrated is a methodology 700 of training linear transforms that separately compensate for a plurality of variability sources. At 702, linear transforms in respective sets for the plurality of variability sources can be initialized. At 704, a variability source from the plurality of variability sources can be selected. At 706, linear transforms in the respective sets for a remainder of the variability sources other than the selected variability source can be fixed (e.g., as current estimates). At 708, utterances can be grouped according to values of the selected variability source. At 710, the linear transforms for the values of the selected variability source can be trained from corresponding groups of the utterances with the linear transforms for the remainder of the variability sources fixed. At 712, it can be determined whether there is a next variability source from the plurality of variability sources that has yet to be selected in a current iteration. If yes, then the methodology 700 returns to 704 and the next variability source can be selected. If it is determined that each of the plurality of variability sources have been selected in a current iteration (e.g., there is not a next variability source) at 712, then the methodology 700 continues to 714. At 714, a determination can be effectuated concerning whether to perform another iteration. The determination can be made based on a comparison with a fixed number of iterations or as a function of convergence of a likelihood of the adaptation data. If it is determined that another iteration is to be performed, then the methodology 700 can return to 704; alternatively, the methodology 700 ends.

Figure 8:
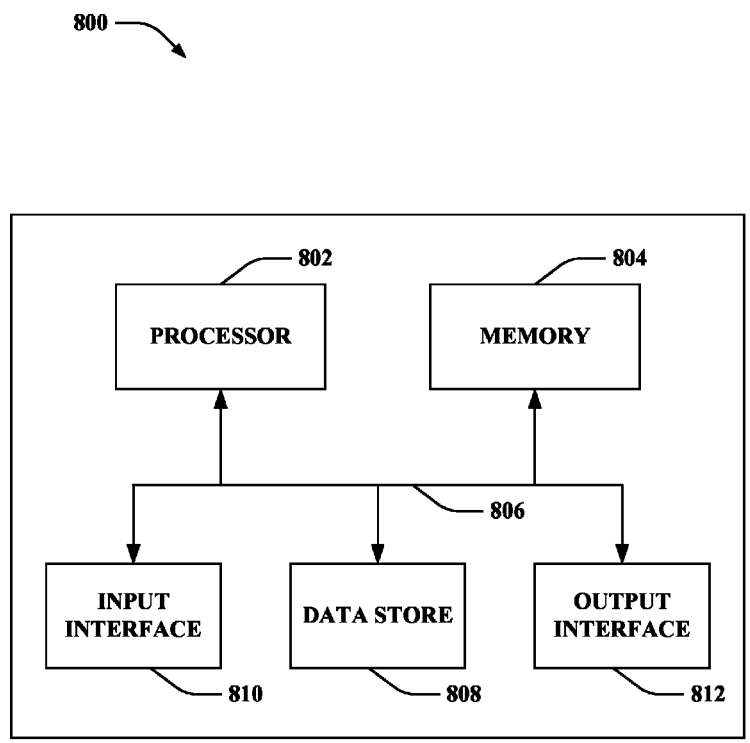
FIG. 8 illustrates an exemplary computing device.

Referring now to FIG. 8, a high-level illustration of an exemplary computing device 800 that can be used in accordance with the systems and methodologies disclosed herein is illustrated. For instance, the computing device 800 may be used in a system that trains and/or employs factored transforms for separable adaptation of acoustic models of a speech recognizer. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store input speech data, sets of linear transforms, training data, adaptation data, and so forth.

The computing device 800 additionally includes a data store 808 that is accessible by the processor 802 by way of the system bus 806. The data store 808 may include executable instructions, store input speech data, sets of linear transforms, training data, adaptation data, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of adapting input speech data inputted to a speech recognizer, the method executed by a processor and comprising:
   selecting a first linear transform from a first set of linear transforms based on a value of a first variability source corresponding to the input speech data, wherein the linear transforms in the first set compensate for the first variability source;
   selecting a second linear transform from a second set of linear transforms based on a value of a second variability source corresponding to the input speech data, wherein the linear transforms in the second set compensate for the second variability source;
   applying the first linear transform to features of the input speech data to generate intermediate transformed speech data, wherein the first linear transform is applied to the features of the input speech data without modifying acoustic models of the speech recognizer;
   applying the second linear transform to features of the intermediate transformed speech data to generate transformed speech data, wherein the second linear transform is applied to the features of the intermediate transformed speech data without modifying the acoustic models of the speech recognizer; and
   recognizing speech based on the transformed speech data to obtain a result, wherein speech recognition is performed on the transformed speech data utilizing the acoustic models of the speech recognizer.

2. The method of claim 1, wherein the first set of linear transforms comprises a set of speaker transforms, the first variability source is speaker variability, the value of the first variability source corresponding to the input speech data is a speaker of the input speech data, the second set of linear transforms comprises a set of environmental transforms, the second variability source is environmental variability, and the value of the second variability source corresponding to the input speech data is an environment in which the input speech data is captured.

3. The method of claim 1, wherein the first set of linear transforms comprises a set of environmental transforms, the first variability source is environmental variability, the value of the first variability source corresponding to the input speech data is an environment in which the input speech data is captured, the second set of linear transforms comprises a set of speaker transforms, the second variability source is speaker variability, and the value of the second variability source corresponding to the input speech data is a speaker of the input speech data.

4. The method of claim 1, wherein the first linear transform and the second linear transform are constrained maximum likelihood linear regression (CMLLR) transforms.

5. The method of claim 1, further comprising reusing the first set of linear transforms and the second set of linear transforms across user sessions.

6. The method of claim 1, further comprising detecting at least one of the value of the first variability source corresponding to the input speech data or the value of the second variability source corresponding to the input speech.

7. The method of claim 1, further comprising:
   selecting a third linear transform from a third set of linear transforms based on a value of a third variability source corresponding to the input speech data, wherein the linear transforms in the third set compensate for the third variability source;
   applying the third linear transform to features of the transformed speech data outputted upon applying the second linear transform, wherein the third linear transform is applied to the features of the transformed speech data outputted upon applying the second linear transform without modifying the acoustic models of the speech recognizer; and recognizing the speech based on output of the third linear transform to obtain the result.

8. The method of claim 1, wherein at least one of the first variability source or the second variability source is one of accent variability, gender variability, channel variability, or device variability.

9. The method of claim 1, further comprising:

retaining the input speech data in a set of adaptation data, wherein the adaptation data in the set is associated with a plurality of values of the first variability source and a plurality of values of the second variability source; and training the first set of linear transforms and the second set of linear transforms as a function of the adaptation data.

10. The method of claim 1, further comprising evaluating an initial silence portion of the input speech data to estimate an environmental cluster, wherein one of the first linear transform or the second linear transform is an environmental transform selected for the environmental cluster.

11. A system that trains linear transforms that separately compensate for a plurality of variability sources, comprising:

at least one processor; and memory that comprises computer-executable instructions that, when executed by the at least one processor, cause the at least one processor to perform acts including:

initializing linear transforms in respective sets for the plurality of variability sources; and sequentially, for each of the plurality of variability sources, training the linear transforms in the respective sets for the plurality of variability sources, wherein training the linear transforms in a particular set for a particular variability source comprises:

fixing the linear transforms in the respective sets for a remainder of the variability sources other than the particular variability source to current estimates;

grouping training utterances based on values of the particular variability source, wherein each of the training utterances has corresponding values for each of the plurality of variability sources; and training the linear transforms for the values of the particular variability source from corresponding groups of the training utterances with the linear transforms for the remainder of the variability sources fixed;

wherein the linear transforms are trained to be applied to features of input speech data prior to recognizing speech without modifying acoustic models of a speech recognizer such that a first linear transform from a first set is to be applied to the features of the input speech data to generate intermediate transformed speech data and a second linear transform from a second set is to be applied to features of the intermediate transformed speech data, and wherein speech recognition is performed on the input speech data as transformed utilizing the acoustic models of the speech recognizer.

12. The system of claim 11, wherein the linear transforms are constrained maximum likelihood linear regression (CMLLR) transforms.

13. The system of claim 11, wherein the plurality of variability sources comprise at least speaker variability and environmental variability.

14. The system of claim 11, wherein the plurality of variability sources comprise at least three variability sources.

15. The system of claim 11, wherein the plurality of variability sources comprise at least one of accent variability, gender variability, channel variability, or device variability.

16. The system of claim 11, the memory further comprising computer-executable instructions that, when executed by the at least one processor, cause the at least one processor to perform acts including:

performing unsupervised clustering of environments associated with the training utterances.

17. The system of claim 16, wherein the linear transforms are trained based on clusters formed by performing the unsupervised clustering.

18. The system of claim 11, wherein the values for each of the plurality of variability sources are determined from labels associated with the training utterances.

19. The system of claim 11, wherein the linear transforms are reusable during runtime across user sessions.

20. A computer-readable storage device including computer-executable instructions that, when executed by a processor, cause the processor to perform acts including:

selecting a speaker transform from a set of speaker transforms based on a speaker corresponding to input speech data, wherein the speaker transforms are linear transforms that compensate for speaker variability;

selecting an environmental transform from a set of environmental transforms based on an environment corresponding to the input speech data, wherein the environmental transforms are linear transforms that compensate for environmental variability;

applying the speaker transform to features of the input speech data to generate intermediate transformed speech data, wherein the speaker transform is applied to the features of the input speech data without modifying acoustic models of a speech recognizer;

applying the environmental transform to features of the intermediate transformed speech data to generate transformed speech data, wherein the environmental transform is applied to the features of the intermediate transformed speech data without modifying the acoustic models of the speech recognizer; and recognizing speech based on the transformed speech data to obtain a result, wherein speech recognition is performed on the transformed speech data utilizing the acoustic models of the speech recognizer.

* * * * *